Patented Apr. 23, 1940

2,198,563

UNITED STATES PATENT OFFICE 2,198,563

METHOD OF COMPLETING WELLS

William W. Robinson, Jr., Los Angeles, Calif., assignor to The Texas Company, New York, N. Y., a corporation of Delaware No Drawing. Application June 4, 1937, Serial No. 146,369

4 Claims. (Cl. 255—1)

This invention relates to the treatment of oil wells and more particularly to a method of completing wells adapted to prevent the sealing off of the producing strata by the drilling mud used in the drilling of the wells.

More specifically my invention comprises a method of completing a well and has as its object the effecting and increasing of the flow and yield from a well by preventing porous strata containing oil or gas from being clogged by drilling muds. I effect the object of my invention by employing a drilling mud comprising a dispersion in water of bentonite and a finely-divided solid which is readily disintegrable by acids, the drilling mud being so constituted that it forms a filter cake or sheath upon the walls of the bore hole and then, when an oil or gas producing formation has been entered or penetrated by the drill, removing the filter cake or mud sheath from the walls of the well by means of an acid.

In drilling wells by means of the rotary method a drilling fluid usually consisting of a dispersion of clay in water is circulated to the locus of drilling by way of the drill stem through openings in the cutting tool. At the locus of drilling the cuttings and debris become suspended in the drilling fluid and are carried upwardly in the space between the drill stem and the bore hole or casing to the surface where the cuttings and debris are allowed to settle out of the drilling fluid. In use it has been observed that the drilling mud forms a compact lining sometimes termed a "filter cake" upon the walls of the bore hole and thereby serves in some measure to prevent the seepage of water into the hole or the caving of the walls of the bore hole.

In those instances where the producing formation contains oil or gas under low pressure it is frequently observed that the filter cake formed on the walls of the bore hole is sufficiently dense to prevent the seepage of the oil and gas into the hole and it is possible in this way for a driller to penetrate a producing formation without being aware of the presence of oil and gas. A disadvantage of the use of ordinary drilling muds is also manifested when drilling high pressure formations. There the drilling mud may penetrate into the oil and gas bearing sand and plug up the interstices between the particles of sand. As a direct result of this plugging action the flow of oil and gas through the sand to the well bore may be considerably decreased.

The above disadvantages inherent in the use of drilling muds consisting of finely-divided solids dispersed in water are well known, and many expedients have been proposed for overcoming them. Chief among these is the proposal to incorporate in the drilling mud finely-divided calcium carbonate with the intent that if the mud sheath has formed it can be removed by subjecting it to the action of a mineral acid such as hydrochloric acid. I have carried out experiments with this procedure and have found that the rate of disintegration of a mud sheath consisting essentially of clay and calcium carbonate is extremely slow and generally unsatisfactory. For example, I found that a drilling mud having the following composition

|  | Per cent by weight |
|---|---|
| Wilmington slough mud | 16.2 |
| Calcium carbonate | 2.5 |
| Water | 81.3 | and weighing approximately 9.4 pounds per gallon, yielded a mud sheath which would not disintegrate appreciably when treated for twenty-four hours at a temperature of 140° F. with 15% hydrochloric acid.

In another case I found that the mud sheath formed from a drilling mud having the following composition

|  | Per cent by weight |
|---|---|
| Wilmington slough mud | 15.6 |
| Calcium carbonate | 6.6 |
| Water | 77.8 | and having a weight of approximately 9.6 pounds per gallon, did not disintegrate after treatment for twenty-four hours at 140° F. with 15% hydrochloric acid.

The results obtained by my experimental work coincide with the experimental data developed by other investigators, and it is now the general conclusion that mud sheaths formed as a result of the use of drilling muds containing calcium carbonate are difficult to disintegrate by means of mineral acids. Although I am not prepared to present any reasons for this it appears that the colloidal matter in the drilling mud in combination with the heavy clay particles seal up the calcium carbonate particles so effectively as to prevent their disintegration by the acid and also inhibit the generation of the gas which should rupture the mud sheath.

I have discovered that the mud sheath formed from drilling muds consisting of dispersions of bentonite and calcium carbonate in water is readily disintegrated by acids. I have also found that the addition of bentonite to a drilling mud containing both clay and calcium carbonate will result in the formation of sheaths which are readily disintegrated by acids.

In order that those skilled in the art may more readily understand my invention I give herewith data developed in the course of my experimental work. A drilling mud was prepared by dispersing sufficient bentonite in water to yield a drilling mud having a viscosity of 81.0 centipoises as measured on the Stormer viscosimeter at a velocity of 600 R. P. M. and a weight of 8.8 pounds per gallon or 65.65 pounds per cubic foot. A filter cake formed from this drilling mud was not affected by treatment with a 15% solution of hydrochloric acid.

To a portion of the above drilling mud there was added approximately 10.1% by weight of calcium carbonate. This drilling mud had a viscosity of 37.5 centipoises as measured on the Stormer viscosimeter at a velocity of 600 R. P. M., and a density of 9.3 pounds per gallon or 69.76 pounds per cubic foot. A filter cake formed from this drilling mud upon treatment with a 15% solution of hydrochloric acid was immediately disintegrated.

To a sample of the foregoing drilling mud there was then added approximately 32.7% by weight of Niger slough mud having a weight of 80.96 pounds per cubic foot, equivalent to the addition of 15% clay solids on the weight of the final limed bentonite-clay mud. Sufficient finely-divided calcium carbonate was added to this mixture to bring the content up to a value of approximately 8.7% by weight. The resulting dispersion of bentonite, lime, and Niger slough mud in water had a weight of 73.63 pounds per cubic foot and a viscosity of 14 centipoises on the Stormer viscosimeter measured at a velocity of 600 R. P. M., and upon treatment of a filter cake prepared therefrom with 15% hydrochloric acid, the filter cake was found to disintegrate immediately. Although I have shown the use of calcium carbonate in the foregoing example, I do not intend to limit myself to the use of this material alone, but contemplate the use of the other alkaline earth carbonates, such for example as magnesium carbonate, barium carbonate, strontium carbonate, and in fact any carbonate which is only slightly soluble in water but which is readily decomposed by acids.

My invention may be carried out in various ways. For example, it is possible to use a drilling mud containing both calcium carbonate and bentonite throughout the drilling operation. Or else the well may be drilled with ordinary mud until the productive horizon is approached, at which time the drilling mud is replaced by a drilling mud consisting essentially of bentonite and calcium carbonate and the drilling continued into the producing strata. I also contemplate the conversion of an ordinary drilling mud into one which yields sheaths readily disintegrable by acids by incorporating therein substantial quantities of bentonite and alkaline earth carbonates such as calcium carbonate, and the use thereof when drilling into or through oil and gas-containing strata.

For disintegrating the mud sheaths prepared in accordance with my invention I prefer the use of dilute hydrochloric or sulphuric acid, but I do not intend to limit myself to the use of these alone, and contemplate the use of any acid, both organic and inorganic, which will attack calcium carbonate or equivalent materials. In employing these acids I also contemplate the use therewith of inhibitors which will serve to protect the casing and drilling tools against undue corrosion.

Obviously many modifications and variations of the invention as hereinbefore set forth may be made without departing from the spirit and scope thereof and only such limitations should be imposed as are indicated in the appended claims.

I claim:

1. A method of completing a well penetrating a productive horizon which comprises employing as a drilling fluid a suspension consisting essentially of bentonite, calcium carbonate, and water under such conditions as to build up along the walls of the bore hole a substantial coating comprising the solid phase of the drilling mud fluid and thereafter removing this coating by treatment with an acid.

2. The method of coating the bore hole of a well with a mud sheath which is readily removable by acid which comprises introducing into the well a drilling mud in which the solids content thereof consists essentially of bentonite and an added water-insoluble carbonate, the bentonite being present in sufficient proportion to produce a mud fluid of the desired viscosity and the water-insoluble carbonate being present in a sufficient proportion to render the mud sheath deposited on the bore hole of the well disintegrable by acid treatment.

3. The method of completing a well which comprises drilling with a clay mud until a productive horizon is approached, then continuing drilling through the productive horizon with a drilling mud consisting essentially of bentonite, alkaline earth carbonate and water to form a mud sheath on the bore hole opposite the productive horizon which is readily disintegrable by acid, and finally treating the said well with acid to remove the mud sheath opposite the productive horizon.

4. The method of coating the bore hole of a well with a mud sheath which is readily disintegrable by acid, which comprises introducing into the well a drilling mud containing substantial amounts of both added bentonite and alkaline earth carbonate, the bentonite being present in a proportion which is greater than that necessary to maintain the solids in suspension but within limits which produce a pumpable mud fluid and the alkaline earth carbonate being present in a large proportion which at least approximates the weight of the other suspended solids of the drilling mud.

WILLIAM W. ROBINSON, Jr.